(12) United States Patent
Falk

(10) Patent No.: US 6,787,746 B2
(45) Date of Patent: Sep. 7, 2004

(54) FOCUS AID FOR CONFOCAL MICROSCOPE

(75) Inventor: Robert A. Falk, Renton, WA (US)

(73) Assignee: Optometrix, Inc., Renton, WA (US)

( * ) Notice: Subject to any disclaimer, the term of this patent is extended or adjusted under 35 U.S.C. 154(b) by 35 days.

(21) Appl. No.: 10/077,151

(22) Filed: Feb. 15, 2002

(65) Prior Publication Data

US 2002/0113202 A1 Aug. 22, 2002

Related U.S. Application Data

(60) Provisional application No. 60/270,828, filed on Feb. 22, 2001.

(51) Int. Cl.[7] .................... G02B 27/40; G02B 27/64; G02B 27/04
(52) U.S. Cl. .................... 250/201.3; 348/345
(58) Field of Search .................... 250/201.3, 201.2, 250/214 AG, 214 C; 348/345, 79; 382/141, 255; 396/81, 82, 87

(56) References Cited

U.S. PATENT DOCUMENTS

| | | | | |
|---|---|---|---|---|
| 5,130,540 A | * | 7/1992 | Yamada et al. | 250/310 |
| 5,585,639 A | * | 12/1996 | Dorsel et al. | 250/458.1 |
| 5,790,710 A | * | 8/1998 | Price et al. | 382/255 |
| 5,892,218 A | * | 4/1999 | Ortyn et al. | 250/201.3 |
| 5,932,872 A | * | 8/1999 | Price | 250/201.3 |
| 6,314,240 B1 | * | 11/2001 | Okawara | 396/81 |

* cited by examiner

Primary Examiner—Thanh X. Luu
Assistant Examiner—Seung C. Sohn
(74) Attorney, Agent, or Firm—Black Lowe & Graham PLLC

(57) ABSTRACT

A system and method for indicating real time focus information for a scanning microscope. The system includes a detector, one or more bandpass filters, and one or more power indicators associated with the one or more bandpass filters. The detector detects an electrical signal from the scanning microscope. The bandpass filters filter the detected electrical signal. The bandpass filters are tuned to a desired range of frequencies. The power indicators detect and display average power of the electrical signal filtered by the corresponding bandpass filter. The system also includes a focusing device that generates a focusing signal based on the detected average power and focuses the scanning microscope based on the generated focusing signal. The focusing device automatically focuses the scanning microscope.

11 Claims, 2 Drawing Sheets

FOCUS AID FOR CONFOCAL MICROSCOPE

PRIORITY CLAIM

This application claims priority from U.S. Provisional Application Ser. No. 60/270,828, filed Feb. 22, 2001.

FIELD OF THE INVENTION

This invention relates to method and apparatus for rapidly determining the focus of a confocal or scanning microscope.

BACKGROUND OF THE INVENTION

Confocal or scanning microscopes obtain images by scanning a focused radiation beam over a target and collecting the reflected radiation. In some confocal microscopes, the target is translated to perform the scanning. In other confocal configurations, the radiation beam is scanned using a scanning mirror system or other scanning means. Reflectance data is collected from the target as a function of the scan position and assembled into an image. Generally, the reflectance is collected by a detector, amplified, digitized with an analog-to-digital converter, and finally processed by a general-purpose computer to form an image on a display. This process is generally slow. Further, the data acquisition time typically increases as the square of the image resolution, e.g. a 1024×1024 pixel image will take approximately 16 times longer to capture and display as a 256×256 pixel image. These larger images can require several seconds to acquire.

A major difficulty with these long image-acquisition times is focusing the microscope. Focusing involves an iterative process of adjusting the axial distance between the target and the microscope and then examining the resultant image for proper focus. This process is made more difficult in a confocal microscope as the image will be black until a rough focus is made. A black image provides no feedback as to correctness of focus. Use of high numerical aperture objectives further compounds the difficulties, as the region of non-blackness (i.e. the depth-of-field) can be only a few micrometers. As an example, the initial focus of a microscope can be off by a few millimeters. Stepping the focus a few micrometers at a time and waiting a few seconds for an image to appear before the next step could take as long as half an hour just to obtain a rough focus. Obtaining a good quality focus will take additional effort.

It is known that the detected signal strength in a confocal microscope is a strong function of focus (z position), which peaks near best focus for the illuminated spot. An indicator of this detected signal strength would give a basic focus capability for a target with a flat surface with fixed reflectivity. However, real world surfaces are not flat and have varying reflectivity.

The current invention remedies these and other deficiencies by supplying a real time indication of focus during the scan period by monitoring the high frequency components of the scanned signal. Real-time feedback allows an operator to find and optimize focus in a few 10's of seconds, as compared to 10's of minutes.

SUMMARY OF THE INVENTION

The present invention includes a system and method for indicating real time focus information for a scanning microscope. The system includes a detector, one or more bandpass filters, and one or more power indicators associated with the one or more bandpass filters. The detector detects an electrical signal from the scanning microscope. The bandpass filters filter the detected electrical signal. The bandpass filters are tuned to a desired range of frequencies. The power indicators detect and display average power of the electrical signal filtered by the corresponding bandpass filter.

In accordance with further aspects of the invention, the one or more bandpass filters includes at least one of a low, medium, or high pass filter.

In accordance with other aspects of the invention, the system further includes a focusing device that generates a focusing signal based on the detected average power and focuses the scanning microscope based on the generated focusing signal. The focusing device automatically focuses the scanning microscope.

In accordance with still further aspects of the invention, the scanning microscope is a confocal microscope.

In accordance with yet other aspects of the invention, the system does not include power indicators and does include a focusing device for generating a focusing signal based on the filtered electrical signal and focusing the scanning microscope based on the generated focusing signal.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

There are many types and configurations of confocal and scanning microscopes. Radiation sources include, but are not limited to, optical sources, electron sources, ion sources, and acoustic sources. Many forms of scanners exist. Additionally, the option of moving the target while maintaining a fixed radiation beam has also been implemented. In addition, transmission and other forms of scanning microscopes exist. The current invention applies to all these forms.

Figure 1:
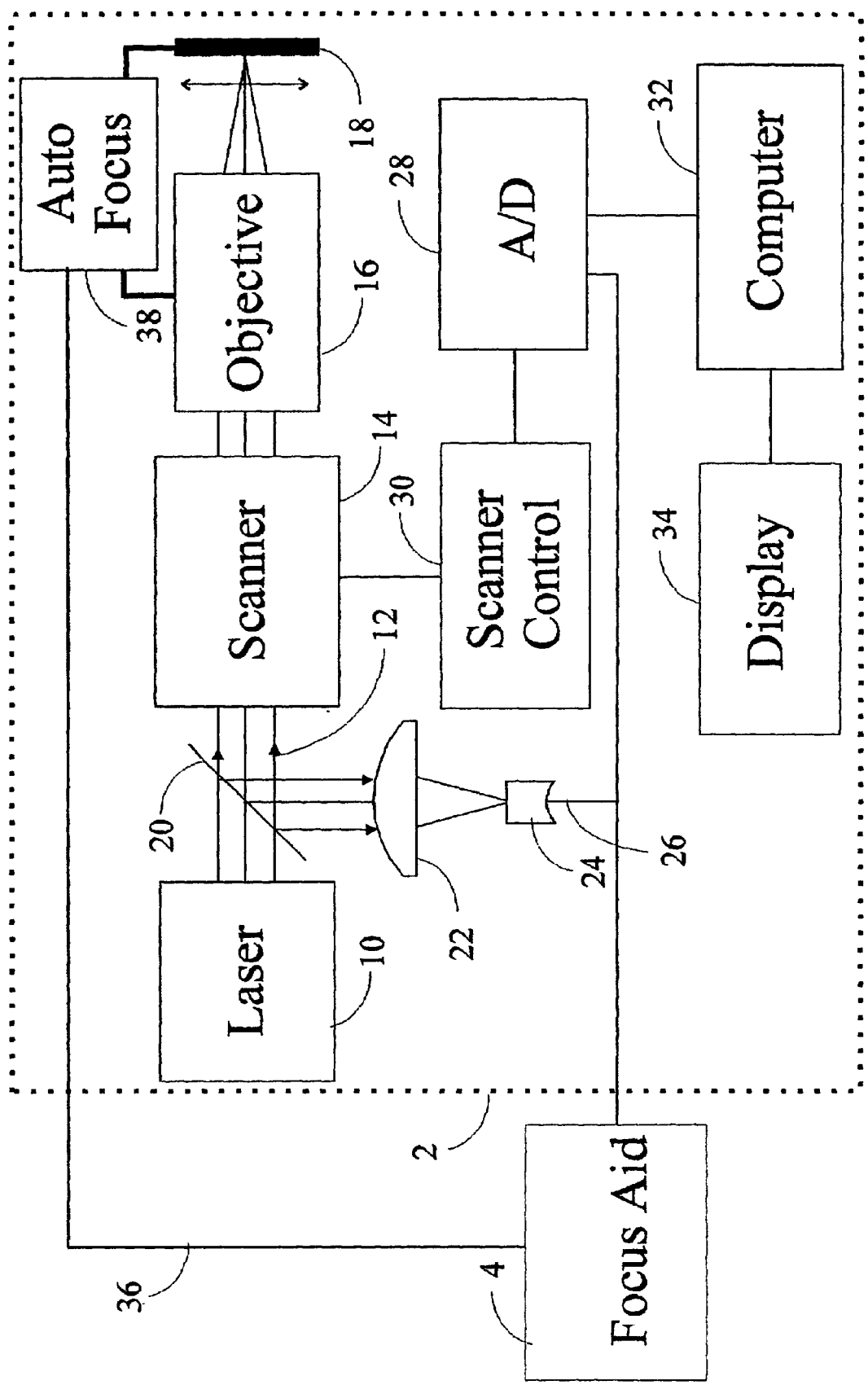
FIG. 1 is an overview of an optical scanning microscope showing the interface to the current invention.

A laser-scanning microscope 2 shown in FIG. 1 is one example of this broad class of microscopes. A radiation source 10 includes a laser, which produces a beam of radiation 12. The beam of radiation passes through a beam splitter 20 to a scanner 14. The scanner 14 scans the beam of radiation over a range of angles in two dimensions. Nominally, the scanner 14 performs a raster scan. An objective 16 focuses this beam of radiation 12 onto a target 18. Some portion of the beam of radiation 12 will be reflected, collected by the objective 16 and passed back through the scanner 14. After passing through the scanner 14, the beam of radiation is deflected by the beam splitter 20 towards a lens 22. The lens 22 focuses the returning beam of radiation 12 onto a detector 24, which converts the beam of radiation into a detected electrical signal 26. In general, the detected electrical signal 26 is proportional to the intensity of the reflected beam of radiation 12. In general, the target will have spatial variations in reflectance, which will produce temporal variations in intensity of the reflected beam of radiation 12 as the beam is scanned over the target. Thus, the detected electrical signal 26 includes a time varying voltage (current) related to the target reflectance.

The detected electrical signal 26 can then be converted into digital format by an analog-to-digital converter 28. The analog-to-digital converter 28 is triggered by a scanner controller 30, which coordinates the angular deflection of the scanner 14 with the timing sequence of the analog-to-digital conversion process. The output of the analog-to-digital converter 28 is then converted by a general-purpose computer 32 into an image that is viewed on a display 34.

An image can be described by its spatial frequency content. That is to say, a two-dimensional Fourier transform of the image intensity versus position can be produced. The frequency content of said transform depends on the focus of the imaging system that produces the image. In particular, the amplitude of the high frequency components of said transform will reduce rapidly as the image is defocused. This mathematical transform description relates directly to the subjective notion of a "sharp focus".

From the description above, it is clear that the detected electrical signal 26 maps the spatial variations in the target reflectance into a time varying signal. Thus, the temporal frequency content of the detected electrical signal 26 is a direct mapping of the spatial frequency content of the target image. This temporal frequency content can be monitored by a focus aid 4 as the image is obtained, thereby producing real time signals to aid in focusing. Further, the focus aid 4 can direct an auto-focus signal 36 to an auto-focus device 38, which adjusts the distance between the objective 16 and the target so as to obtain best focus automatically.

Figure 2:
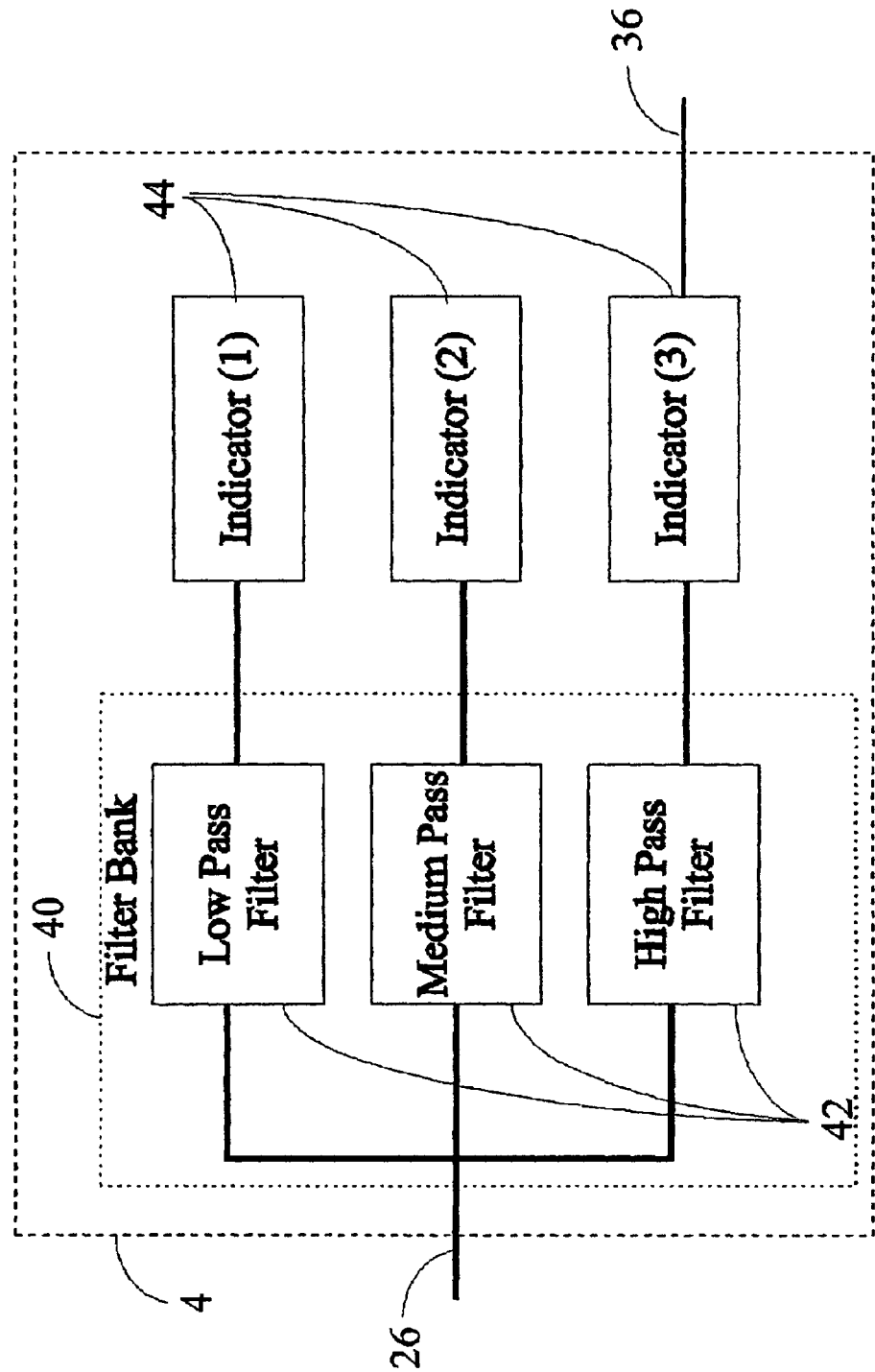
FIG. 2 is a block diagram of the current invention.

FIG. 2 shows the preferred embodiment of the focus aid 4. The detected electrical signal 26 is passed into a filter bank 40, which contains a multiplicity of bandpass filters 42. Three bandpass filters 42 are shown in this example. Each filter will only allow some band of frequencies to pass. In the example shown, a low pass filter will pass those detected electrical signal 26 frequency components from DC to some low frequency, e.g. 100 Hertz. A medium pass filter will pass those detected electrical signal 26 frequency components from the high frequency end of the low pass filter (100 Hertz) to some intermediate frequency, e.g. 3,000 Hertz. Likewise, a high pass filter will pass those detected electrical signal 26 frequency components from the high frequency end of the medium pass filter (3,000 Hertz) to some higher frequency, e.g. 100,000 Hertz. The exact frequency bands selected depend on details of the scan rates. The frequency bands selected may overlap or not overlap for a particular scanning microscope system. The number of filters needed is also dependent on the particular scanning microscope system.

The output of each bandpass filter 42 is directed to a power indicator 44. The power indicator 44 displays the average power contained in the output from the bandpass filter 42 to an operator or an automated focusing system. In this fashion, the frequency content of the image can be monitored in real time. Low frequency content can be utilized to determine rough focus, while maximizing the high frequency content produces a sharp focus. As shown, the auto-focus signal 36 derives from the high frequency content. Many other combinations are possible.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A apparatus for indicating real time focus in a scanning microscope, the apparatus comprising:

a detector for converting a radiation beam generated by the scanning microscope into an analog electrical signal;

one or more bandpass filters for filtering the analog electrical signal, wherein the one or more bandpass filters are tuned to a desired range of frequencies; and one or more power indicators for detecting and displaying average power of the filtered analog electrical signal of a corresponding bandpass filter.

2. The apparatus of claim 1, wherein the one or more bandpass filters comprises at least one of a low, medium, or high pass filter.

3. The apparatus of claim 1, further comprising a focusing device for generating a focusing signal based on the detected average power and focusing the scanning microscope based on the generated focusing signal.

4. The apparatus of claim 3, wherein the focusing device automatically performs generating and focusing.

5. The apparatus of claim 1, wherein the scanning microscope is a confocal microscope.

6. A method for indicating real time focus in a scanning microscope, the method comprising:

converting a radiation beam generated by the scanning microscope into an analog electrical signal;

filtering the detected analog electrical signal according to one or more frequency ranges; and detecting average power of the filtered electrical signal for each of the one or more frequency ranges; and displaying each of the detected average powers of the analog electrical signal.

7. The method of claim 6, wherein filtering is performed by one or more bandpass filters.

8. The method of claim 7, wherein the one or more bandpass filters comprises at least one of a low, medium, or high pass filter.

9. The method of claim 6, further comprising:

generating a focusing signal based on the detected average power; and focusing the scanning microscope based on the generated focusing signal.

10. The method of claim 9, wherein focusing comprises automatically focusing.

11. The method of claim 6, wherein the scanning microscope is a confocal microscope.

* * * * *